ELECTRONIC STEPPING SWITCH FOR REVERSIBLE COUNTING

Filed Oct. 28, 1960 2 Sheets-Sheet 1

INVENTOR.
IRVING HORN

BY H. A. Mackey

ATTORNEY.

ELECTRONIC STEPPING SWITCH FOR REVERSIBLE COUNTING

Filed Oct. 28, 1960 2 Sheets-Sheet 2

INVENTOR.
IRVING HORN

BY H. S. Mackey

ATTORNEY.

3,118,132

ELECTRONIC STEPPING SWITCH FOR REVERSIBLE COUNTING

Irving Horn, Hartsdale, N.Y., assignor to General Precision, Inc., a corporation of Delaware
Filed Oct. 28, 1960, Ser. No. 65,769
12 Claims. (Cl. 340—168)

This invention relates to switches and more particularly to electronic stepping switches which are particularly useful in binary digital computing and logic circuits.

In digital computers, logic circuits, and data processing systems, step switches are very often required to complete a routine or sub-routine or for distributing data to preselected storage or utilization devices. Where the largest number being handled is small or the distribution system is simple, mechanical stepping switches may be used to good advantage. However, if large binary numbers are being handled or if a complex distribution is desired, mechanical switches become cumbersome and present many problems which limit the size of the computer or distribution system that may be used.

Electronic stepping switches have been constructed but they also suffer from the same limitations set forth above since they are complex in their structure and are limited in the number of functions they can perform without extensive alternations.

One object of this invention is to provide an electronic stepping switch which is simple in construction and capable of processing large binary numbers or operating a complex distribution system.

Another object of the invention is to provide an electronic stepping switch which is capable of highspeed operation.

A further object of this invention is to provide an electronic stepping switch which provides multiple modes of operation and is easily converted from one mode to another without the necessity of circuit changes.

Another object of this invention is to provide an electronic stepping switch which is compact, easily constructed and which is reliable in operation.

Yet another object of this invention is to provide an electronic stepping switch which can handle large binary numbers and is not limited in its number capacity by space or weight considerations.

The invention contemplates an electronic switch which when properly arranged provides any one of the following functions:

(1) Automatic count up from a number $a_1$ to $m$ to 0 to $a_1$, and repeats. In this instance $a_1$ is any number from 0 to $m$ and $m$ is the maximum number the system is designed to handle.

(2) Automatic count up from a number $a_1$ to $(a_1+1)$ and stop.

(3) Automatic count up from a number $a_1$ to $(m-a_2)$ and stop. Here $a_2$ is any number from 0 to $m$.

NOTE.—If an ordinary count up is desired, the quantity $(m-a_2)$ must be greater than $a_1$. If $(m-a_2)$ is less than $a_1$, the count will increase from $a_1$ to $m$ to 0 and stop at $(m-a_2)$.

(4) Automatic count down from a number $a_1$ to 0 to $m$ to $a_1$ and repeats.

(5) Automatic count down from a number $a_1$ to $(a_1-1)$ and stop.

(6) Automatic count down from a number $a_1$ to $(m-a_2)$ and stop. Here $a_2$ is as above stated but if an ordinary count down is desired, the quantity $(m-a_2)$ must be less than $a_1$. If $m-a_2)$ is greater than $a_1$, the count will decrease from $a_1$ to 0 to $m$ and stop at $(m-a_2)$.

The foregoing and other objects and advantages of the invention will appear more clearly from a consideration of the specification and drawings wherein one embodiment of the invention is described and shown in detail for illustration purposes only.

Figure 1:
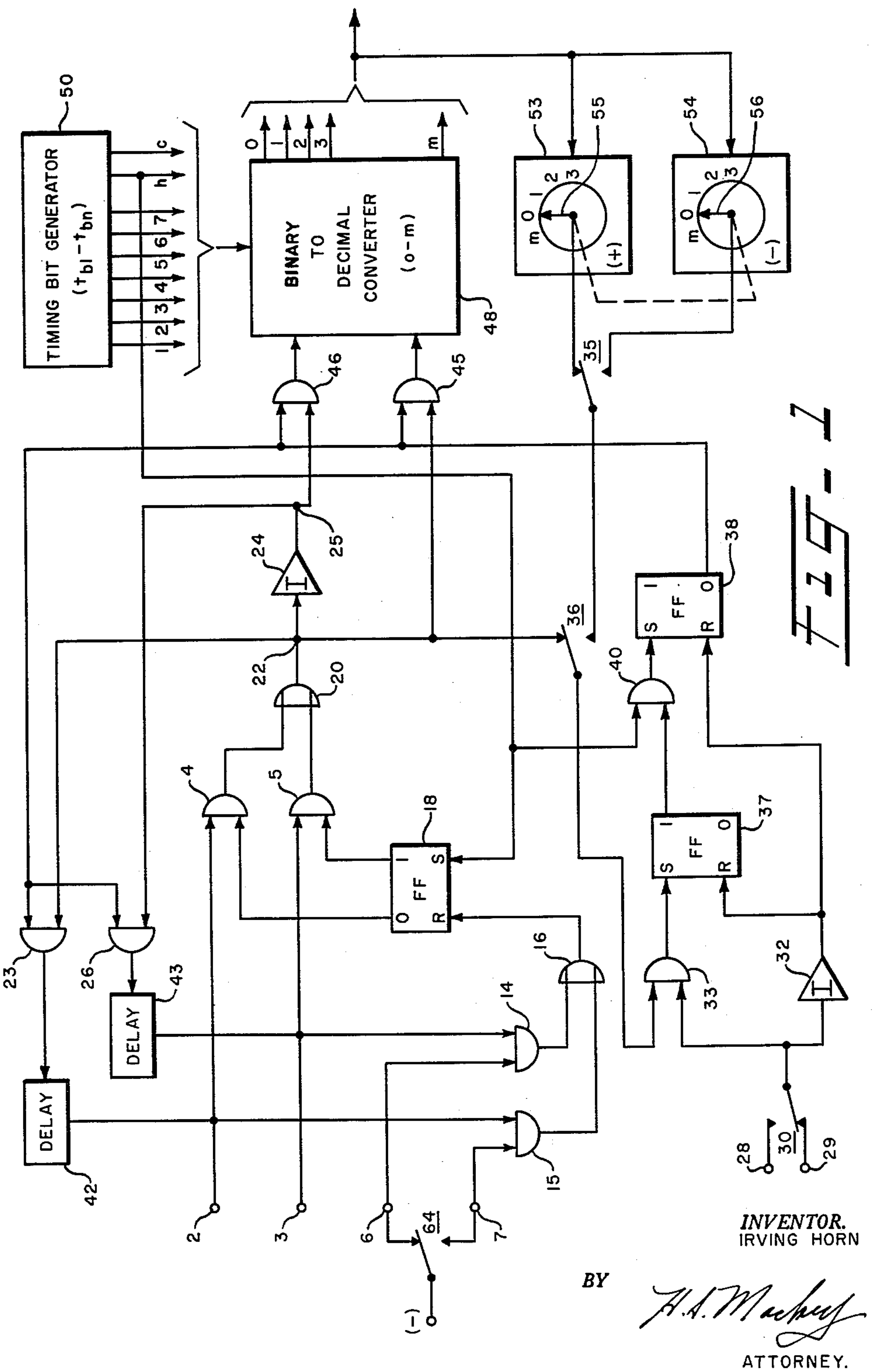
FIGURE 1 is a schematic and block diagram of a novel electronic switch constructed in accordance with the invention.

In FIGURE 1 a pair of random access input terminals 2 and 3 are connected to "and" gates 4 and 5 respectively. Terminals 2 and 3 are connected to a randomly selected binary number and its complement respectively which are serially applied to their respective terminals. The number applied to terminal 2 is the number previously referred to as $a_1$ and the complement of that number is applied to the terminal 3.

Another pair of terminals 6 and 7 are connected to a pair of "and" gates 14 and 15 respectively. Terminals 6 and 7 are selectively connected to a negative voltage source by a SPDT switch 64 and provide, when connected to the source, a count up function and count down function respectively. Terminals 2 and 3 are also connected to "and" gates 15 and 14, respectively, and the outputs of "and" gates 14 and 15 are connected through an "or" gate 16 to the reset input of a clock operated flip-flop 18. Switch 64, "and" gates 14 and 15 and "or" gate 16 cooperate to provide a selective logic control function since the position of switch 64 determines whether the circuit will count up or down from the numerical value of the coded signal inserted at terminal 2. The set input of flip-flop 18 is connected to the $n^{th}$ conductor of a timing bit generator 59 which supplies $n$ successive pulses on $n$ conductors. The 0 output of the flip-flop 18, which may be considered a bistable switch, is connected to the other input of "and" gate 4 and the 1 output to the other input of "and" gate 5 and enables either gate 4 or 5 depending on the condition of the inputs R and S.

It should be noted at this time that a 0 voltage level is used to indicate a 0 in the binary system of numbers and a negative voltage level is used to indicate a 1 in the binary system of numbers. Thus the 0 output of flip-flop 18 will be negative and enable "and" gate 4 when the flip-flop is reset and the 1 output will become negative and enable "and" gate 5 when the flip-flop is set.

The outputs of gates 4 and 5 are connected through an "or" gate 20 to a terminal 22. Terminal 22 is connected to one input of an "and" gate 23 and to the input of an inverting amplifier 24 whose output is connected to a terminal 25 which is in turn connected to one input of an "and" gate 26.

In the following description, reference will be made to the 1's level and to the 0's level. When the 1's level is used, reference is made to that voltage which represents a 1 in the binary system and when the 0's level terminology is used, reference is made to that voltage which represents a 0 in the binary system. In the system arbitrarily chosen for description here, the 1's level is a negative voltage of some predetermined magnitude of between −10 and −16 volts D.C. and the 0's level is a voltage between 0 and −1 volt D.C. As was pointed out, these values were arbitrarily chosen and could very well have been interchanged or changed to some other values so long as once chosen they are adhered to thereafter.

A pair of terminals 28 and 29 are connected to voltage sources at the 1's and 0's level, respectively, and are alternatively connected by a SPDT switch 30 to the input of an inverting amplifier 32 and to one input of an "and" gate 23. The other input of "and" gate 33 is connected alternatively to terminal 22 and to a SPDT switch 35 by a SPDT switch 36. Switch 35 is connected to two sources which will be described later.

The output of inverting amplifier 32 is applied to the reset input of a flip-flop 37 and to the reset input of another flip-flop 38. The output of "and" gate 33 is connected to the set input of flip-flop 37 and the 1's output of flip-flop 37 is connected to one input of an "and" gate 40. The other input of "and" gate 40 is connected to the timing bit generator previously referred to and receives the $n$th bit as does flip-flop 18, and the output of the gate is connected to the set input of flip-flop 38.

The 0's output of flip-flop 38 is connected to the other inputs of gates 23 and 26. Flip-flops 37 and 38 operate in the same manner as does flip-flop 18. Thus, when flip-flop 37 is set, the 1's output becomes negative which enables gate 40. When the reset input of flip-flop 38 is energized, the 0's output becomes negative which enables gates 23 and 26. The output of gate 23 is connected to terminal 2 by a delay circuit 42 and the output of gate 26 is connected to the terminal 3 by a delay circuit 43. Delay circuits 42 and 43 provide $n$ bits of delay where $n$ is the number of bits in the binary code employ in the system.

Terminals 22 and 25 are also connected to one input of a pair of "and" gates 45 and 46, respectively, and the 0's output of flip-flop 38 is connected to the other input of both gates. An $m$ unit converter 48 which converts the binary output of the number and its complement on gates 45 and 46, respectively, into the decimal equivalent of the number serially applied through gate 45 is connected to the outputs of the gates.

Figure 2:
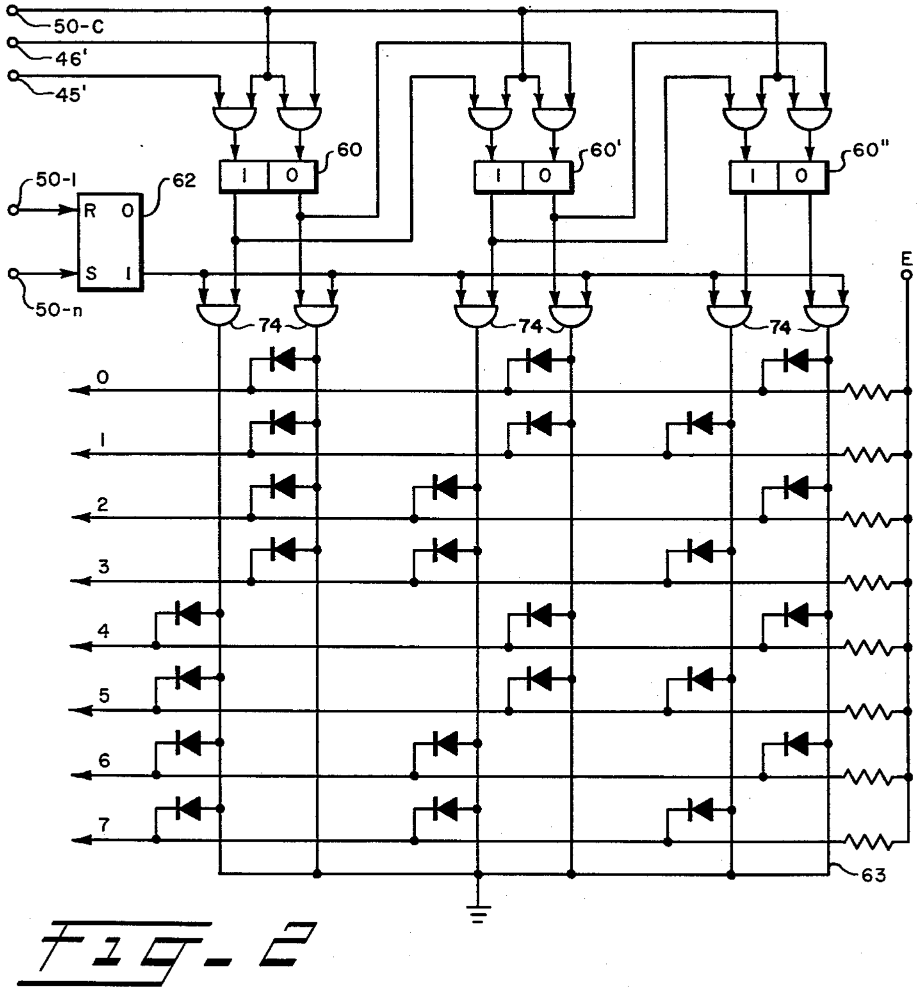
FIGURE 2 is a schematic diagram of the converter shown in FIGURE 1.

Converter 48 is connected to the timing bit generator 50 and utilizes certain outputs from the generator which are shown in detail in FIGURE 2. The distributor has "$m$" output conductors which are connected in parallel to a pair of biased rotary switches 53 and 54. The rotor 55 of switch 53 is connected to one contact of switch 35 and the rotor 56 of switch 54 is connected to the other contact of switch 35. Rotary switch 53 is biased so that rotor 55 connects the number "one" output of distributor 48 to switch 35 whenever the common indicator of switches 53 and 54 is positioned at the number 2 and rotary switch 54 is biased so that its rotor 56 connects the number "three" output of distributor 48 to switch 35 whenever the common indicator is positioned at the number 2. The physical arrangement of these switches is shown in FIGURE 3 and will be described in greater detail later.

The converter shown in FIGURE 2 is limited to binary numbers having three digits but it is illustrative of the type which may be used and may be expanded to accommodate a binary code of more than three digits. A shift register having three identical flip-flops 60, 60′ and 60″ is connected to the clock output of generator 50 by a terminal 50–$c$ and to the outputs of gates 45 and 46 by terminals 45′ and 46′, respectively.

The shift register converts the serial binary number to a parallel output and another flip-flop 62 gates the register output between the $n$th and the first clock pulses into a diode matrix 63 which performs the actual conversion. Flip-flop 62 has its set input connected to the "$n$" conductor from generator 50 by a terminal 50–$n$ and its reset input connected to "1" conductor from generator 50 by a terminal 50–1. Thus, the flip-flop is set on the $n$th clock pulse and reset on the first clock pulse of the next set of $n$ clock pulses. When flip-flop 62 is set it enables "and" gates 74 and the output of shift register between the $n$th and the next clock pulse is inserted into the diode matrix 63 which converts the binary information into decimal information.

Figure 3:
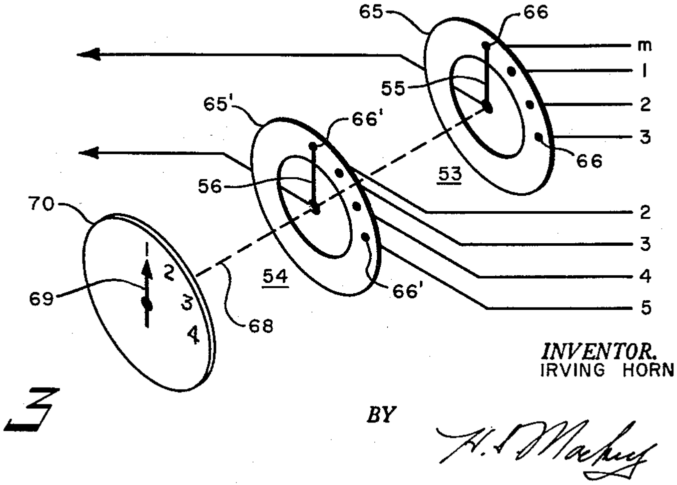
FIGURE 3 is an exploded schematic view of the distributor switches shown in FIGURE 1.

In FIGURE 3 switches 53 and 54 each include a similar disc member 65 and 65′, respectively, each of which has a plurality of contacts 66 and 66′, respectively. The discs are oriented so that the contacts 66 and 66′ in the two discs overlie each other in the axial direction. The first contact on the disc of switch 53 is connected to the $m$ output of converter 48 and the second, third and fourth to the one, two and three outputs, respectively. The first contact on the disc of switch 54 is connected to the two output of converter 48 and the second, third and fourth to the three, four and five outputs, respectively.

The wipers 55 and 56 are mechanically connected to a shaft 68 as is a common pointer 69 which cooperates with a numbered disc 70. Thus when pointer 69 is set, as shown, the "$m$" output of converter 48 is connected to one contact of switch 35 and the "two" output to the other. If a count up is required, switch 35 is placed in the position shown so that the "$m$" output is applied through switch 36 and "and" gate 33 to set flip-flop 37. If, on the other hand, a countdown is desired, switch 35 is reversed and the "two" output sets flip-flop 37. The numbers on disc 70 are also in axial alignment with the contacts 66 and 66′ and as indicator 69 is moved from 1 to 2 the rotors 55 and 56 move to the next clockwise contacts to set flip-flop 37 with the "one" or "three" output of the converter depending on the position of switch 35.

*Operation*

When a repetitive count-up from a number $a_1$ to $m$ is desired, switch 64 is positioned to connect the negative voltage supply to terminal 6 and switch 30 is positioned to connect the zero's level voltage to the input of amplifier 32 and to "and" gate 33. The position of switch 36 and indicator 69 of rotary switches 53 and 54 has no effect on the circuit operation and may be ignored. The number $a_1$ is applied serially, least significant digit first, to terminal 2 and the complement of number $a_1$ is applied serially to terminal 3. When switches 64 and 30 are arranged as described above, the output of distributor 48 will start at $a_1$ and count up to $m$ whereupon it will revert to zero and count up to $a_1$, and the cycle will repeat until stopped. If switch 64 is reversed so that the negative voltage supply is connected to terminal 7, the output of distributor 48 will start at $a_1$ and count down to zero whereupon it will go to $m$ and count down to $a_1$. Here again the cycle will repeat until stopped.

When switch 30 connects the 1's level voltage to the input of inverting amplifier 32 and "and" gate 33, a different mode of operation is obtained. Here one of two possible modes are available depending on the position of switch 36.

If switches 36 and 64 are as illustrated in the drawing and switch 30 connects terminal 28 to the circuit, the distributor 48 will count up one digit from the number $a_1$ applied to input terminal 2. When switch 64 is reversed to connect the negative voltage supply to terminal 7 the distributor 48 will count down one digit from the number $a_1$ applied to input terminal 2. In this mode as in the above the number $a_1$ and its complement are applied serially with the least significant digit first.

If, however, switch 36 is reversed so as to connect the output of rotary switches 53 or 54, depending on the position of switch 35, to the input of gate 33, the count up or down of distributor 48 will proceed to the number indicated by the setting of indicator 69.

The operation of the system is best illustrated by a specific example which uses real numbers. In order to simplify the explanation, the assumption is made that the maximum number of digits is $n=4$ which provides in binary form a maximum binary number 1111 which is 15. Assuming further that a repetitive count up from binary 0010, which is equivalent to the decimal 2, is desired, then switch 64 and 30 will be in the positions shown and the position of switch 36 has no bearing on the circuit operation.

At the occurrence of a $t_{bn}$ which in this instance occurs every fourth bit, flip-flop 18 is set, thus when the first bit of the binary number and its complemennt are applied at terminals 2 and 3 respectively, gate 5 is enabled and gate 4 is inhibited. Since the first bit of the number is zero, the first bit of the complement will be a one and, therefore, a one output will be provided at gate 5. At the same time, the one from terminal 3 and the negative voltage at terminal 6 provide an output through gates 14 and 16 which resets flip-flop 18. After flip-flop 18 is reset, gate 4 is enabled and gate 5 is disabled. Thus, when the second bit of the number which is a one is applied to gate 4, it passes and provides a second one at terminal 22. The remaining two bits of the number are zeros and, therefore, since flip-flop 18 is reset, the two ones at terminal 22 are followed by two zeros. The binary number 0011 provided at terminal 22 is equal to the decimal 3 and is applied to the distributor 48 in the form of the binary 3 through gate 45 and the complement of the binary 3 through inverting amplifier 24 and gate 46.

Since switch 30 connects the 0's level to the circuit, gate 33 is inhibited and neither the output at terminal 22 nor the output of switches 53 or 54 can affect the circuit operation. The output of inverting amplifier 32, however, maintains flip-flop 38 in the reset state which enables gates 23, 26, 45 and 46 so that the number at terminal 22 and its complement are returned through delay circuits 42 and 43, respectively, to terminals 2 and 3, respectively, after a four bit delay. This places the binary 3 at the input and extracts the binary four at terminal 22. The process is repeated and will continue until stopped. If a count down is desired, switch 64 must be moved to its alternate position and this will reset flip-flop 18 at the time when the first 1 of the number occurs. Thus, if a count down is desired and the binary 2 is inserted, the output at terminal 22 will be 0001 which is binary 1 since the first bit of the complement provides a one and the second bit of the number resets flip-flop 18 which disables gate 5 during the third and fourth bits. Here again the binary 1 at terminal 22 is delayed along with its complement and applied to terminal 2 while the delayed complement is applied to terminal 3. At the same time, flip-flop 18 is set at $t_4$ and enables gate 5 for the first bit time so that the process may be repeated until stopped. Stopping the process may be accomplished in a number of ways but the easiest and most obvious is to break the feed back path through delay circuits 42 and 43. Once this is done the converter 48 must be cleared or reset before a new count may be started.

If a count up by one is desired, switch 30 must be moved to its alternate position so that the 1's level voltage is applied to the circuit and switch 36 must be as illustrated. The count up proceeds as previously described. However, the first bit which is a 1 at terminal 22 sets flip-flop 37 since gate 33 is enabled at all times and the $t_4$ bit sets flip-flop 38 which causes the 0 output to go the 0's level thus inhibiting gates 23, 26, 45 and 46. When these gates are inhibited, the count up stops. For a count down, by one, all that need be done is to reverse switch 64 and the process proceeds as previously described. It should be noted at this point that a count down by one is not possible from 1 since at zero the output at terminal 22 is all zeros. There flip-flop 37 will not be set but will go one more cycle before it is set. Likewise a count up by one from the maximum number is not possible since the next number is also zero. However, in both cases the zero will appear at the distributor output and the count will stop with the completion of one more cycle of operation.

A count up to a specific number is similar to a count up by one. The difference here is the position of switches 36 and 35 and the setting of indicator 69 of rotary switches 53 and 54. In this instance the rotary switches provide the output for inhibiting gates 23, 26, 45 and 46. If on a count up the count is to be stopped at 5, the 4 output of converter 48 is supplied through switches 53, 35 and 36 to set flip-flop 37. This is accomplished after the $t_{bn}$ of the 4 output and the $t_{bn}$ of the fifth or desired output sets flip-flop 38 which inhibits gates 23, 26, 45 and 46 to stop circuit operation at 5. Similarly a count down to a specific number is accomplished by setting indicateor 69 at the desired number and setting switch 35 to apply the next higher number output from converter 48 through switches 54, 35 and 36 to set flip-flop 37 on the $t_{bn}$ of the next higher output. Then the $t_{bn}$ of the indicated output sets flip-flop 38 which inhibits gates 23, 26, 45 and 46 to stop the circuit operation as previously described.

Although one embodiment only of the invention has been shown and described in detail for illustration purposes, it is to be expressly understood that the invention is not to be limited thereto.

What is claimed is:

1. A circuit for modifying a binary coded electronic signal comprising first gate means, first means for connecting said first gate means to a binary coded electronic digital signal, second gate means, second means for connecting said second gate means to an electronic digital signal which is the complement of the binary coded signal, bistable circuit means having two inputs and providing two opposed outputs one of which may occupy one of two possible states dependent on the signal applied to said inputs, selective means for connecting either the said first or the said second means to one of the inputs of the bistable circuit means to count down the binary coded signal when the first means is connected and count up the binary coded signal when the second means is connected to the said input, means for supplying a pulse during the last digit time of the binary coded signal to the other input of the bistable means, means for connecting one of the outputs of the bistable circuit means to the second gate means so that said second gate means is enabled during at least the first digit of the binary coded electronic signal and for connecting the other output to the first gate means, and means for combining the outputs of the first and second gate means to provide the modified binary coded signal.

2. A circuit for modifying a binary coded electric signal comprising a first "and" gate having two inputs and one output with one of said inputs providing a connection to a binary coded electronic digital signal, a second "and" gate having two inputs and one output with one of its inputs providing a connection to a digital electronic signal which is the complement of the binary coded signal, a flip-flop having a set and a reset input and providing two opposed outputs one of which may occupy one of two possible voltage states depending on the signal applied to the set and reset inputs, selective means for connecting the reset input of the flip-flop to the number or its complement so that the number is increased when its complement is connected and decreased when it is connected, means for applying a pulse during the last digit time of the binary coded signal to the set input of the flip-flop, means for connecting one of the flip-flop outputs to the other input of the second "and" gate so that the second "and" gate is enabled during at least the first digit time of the binary coded signal, means for connecting the other flip-flop output to the other input of the first "and" gate, and an "or" gate for combining the outputs of the first and second "and" gates to provide the modified binary coded signal.

3. A circuit for modifying a binary coded electronic signal comprising first gate means, first means for connecting said first gate means to a binary coded electronic digital signal, second gate means, second means for connecting said second gate means to an electronic digital signal which is the complement of the binary coded signal, bistable circuit means having two inputs and providing two opposed outputs one of which may occupy one of two possible states dependent on the signal applied to said inputs, selective means for connecting either the said first or the said second means to one of the inputs of the bistable circuit means to count down the binary coded signal when the first means is connected and count up the binary coded signal when the second means is connected to the said input, means for supplying a pulse during the last digit of the binary coded signal to the other input of the bistable means, means for connecting one of the outputs of the bistable circuit means to the second gate means so that said second gate means is enabled during at least the first digit of the binary coded electric signal and for connecting the other output to the first gate means, means for combining the outputs of the first and second gate means to provide the modified binary coded signal, a first feedback loop connected between said means for combining the outputs of the first and second gate means and the first gate means input including a delay means having a delay equal to the length of the binary coded electric signal, and a second feedback loop connected between the said means for combining the outputs of the first and second gate means and the input of the said second gate means which includes an inverter and a delay means which has a delay equal to the length of the said binary coded electric signal.

4. A circuit for modifying a binary coded electric signal comprising a first "and" gate having two inputs and one output with one of said inputs providing a connection to a binary coded electronic digital signal, a second "and" gate having two inputs and one output with one of its inputs providing a connection to a digital electronic signal which is the complement of the binary coded signal, a flip-flop having a set and a reset input and providing two opposed outputs one of which may occupy one of two possible voltage states depending on the signal applied to the set and reset inputs, selective means for connecting the reset input of the flip-flop to the number of its complement so that the number is increased when its complement is connected and decreased when it is connected, means for applying a pulse during the last digit time of the binary coded signal to the set input of the flip-flop, means for connecting one of the flip-flop outputs to the other input of the second "and" gate so that the second "and" gate is enabled during at least the first digit time of the binary coded signal, means for connecting the other flip-flop output to the other input of the first "and" gate, an "or" gate for combining the outputs of the first and second "and" gates to provide the modified binary coded signal, a first feedback loop connected between said "or" gate and the first "and" gate input including a delay means having a delay equal to the length of the binary coded electric signal, and a second feedback loop connected between the said "or" gate and the input of the second "and" gate which includes an inverter and a delay means which has a delay equal to the length of the said binary coded electric signal.

5. A circuit for modifying a binary coded electronic signal comprising first gate means, first means for connecting said first gate means to a binary coded electronic digital signal, second gate means, second means for connecting said second gate means to an electronic digital signal which is the complement of the binary coded signal, bistable circuit means having two inputs and two opposed outputs one of which may occupy one of two possible states depending on the signals applied to the said inputs, selective means for connecting either the said first or the said second means to one input of the bistable circuit means to count down the binary coded signal when the first means is connected and count up the binary coded signal when the second means is connected, means for supplying a pulse during the last digit time of the binary coded signal to the other input of the bistable means, means for connecting one of the outputs of the bistable circuit means to the second gate means such that the said second gate means is enabled during at least the first digit time of the binary coded electronic signal, means for connecting the other output of the bistable means to the said first gate means, means for combining the outputs of the first and second gate means to provide the incrementally modified binary coded signal, a first feedback loop connected between the means for combining the outputs of the first and second gate means and the first gate means, said first feedback loop including a delay circuit which provides a delay equal to the length of the binary coded electronic signal and circuit means responsive to an electric signal for opening the feedback loop, a second feedback loop connected between the said means for combining the outputs of the first and second gate means and the said second gate means, said second feedback loop including an inverter connected directly to the means for combining the outputs of the first and second gate means, a delay circuit which provides a delay equal to the length of the binary coded electronic signal and a circuit means responsive to an electric signal for opening the second feedback loop, selective means connected to the means for combining the outputs of the first and second gate means and to the said inverter for supplying an electric output when the values of the output from the combining means and its complement from the inverter attain the preselected value, and means for connecting the output of said selector means to the said circuit means for opening the first and second feedback loops, respectively.

6. A circuit for modifying a binary coded electric signal comprising a first "and" gate having two inputs and one output with one of said inputs providing a connection to a binary coded electronic digital signal, a second "and" gate having two inputs and one output with one of its inputs providing a connection to a digital electronic signal which is the complement of the binary coded signal, a flip-flop having a set and a reset input and providing two opposed outputs one of which may occupy one of two possible voltage states depending on the signal applied to the set and reset inputs, selective means for connecting the reset input of the flip-flop to the number or its complement so that the number is increased when its complement is connected and decreased when it is connected, means for applying a pulse during the last digit time of the binary coded signal to the set input of the flip-flop, means for connecting one of the flip-flop outputs to the other input of the second "and" gate so that the second "and" gate is enabled during at least the first digit time of the binary coded signal, means for connecting the other flip-flop output to the other input of the first "and" gate, an "or" gate for combining the outputs of the first and second "and" gates to provide an incrementally modified binary coded signal, a first feedback loop connected between the "or" gate and the first "and" gate, said first feedback loop including a delay circuit which provides a delay equal to the length of the binary coded electronic signal and circuit means responsive to an electric signal for opening the feedback loop connected between the "or" gate and the said second "and" gate, said second feedback loop including an inverter connected directly to the "or" gate, a delay circuit which provides a delay equal to the length of the binary coded electronic signal and a circuit means responsive to an electirc signal for opening the second feedback loop, selective means connected to the "or" gate and to the said inverter for supplying an electric output when the values of the output from the "or" gate and its complement from the inverter attain the preselected value and means for connecting the output of said selector means to the said circuit means for opening the first and second feedback loops, respectively.

7. A circuit for modifying a binary coded electronic signal comprising first gate means, first means for connecting said first gate means to a binary coded electronic digital signal, second gate means, second means for connecting said second gate means to an electronic digital signal which is the complement of the binary coded signal, bistable circuit means having two inputs and two opposed outputs one of which may occupy one of two possible states depending on the signals applied to the said inputs, selective means for connecting either the said first or the said second means to one input of the bistable circuit means to count down the binary coded signal when the first means is connected and count up the binary coded signal when the second means is connected, means for supplying a pulse during the last digit time of the binary coded signal to the other input of the bistable means, means for connecting one of the ouputs of the bistable circuit means to the second gate means such that the said second gate means is enabled during at least the first digit time of the binary coded electronic signal, means for connecting the other output of the bistable means to the said first gate means, means for combining the outputs of the first and second gate means to provide the incrementally modified binary coded signal, a first feedback loop connected between the means for combining the outputs of the first and second gate means and the first gate means, said first feedback loop including a delay circuit which provides a delay equal to the length of the binary coded electronic signal and an "and" gate, a second feedback loop connected between the means for combining the outputs of the first and second gate means and the said second gate means, said second feedback loop including an inverter connected directly to the means for combining the outputs of the first and second gate means, a delay circuit which provides a delay equal to the length of the binary coded electronic signal and an "and" gate, voltage supply means connected to the "and" gates in the first and second feedback loops for maintaining said gates in an enabled condition to maintain said loops closed, first selective means connected to the means for combining the outputs of the first and second gate means and to the said inverter for supplying an electric output when the values of the output from the combining means and its complement from the inverter attain the preselected value, means for alternatively connecting the output from said first selective means or the output from the means for combining the outputs of the first and second gate means to the voltage supply means to disable said supply means and the gates in the feedback loops whenever the connected means develops an output, and second selective means connected to said voltage supply means for overriding the outputs from the first selective means or the means for combining the outputs of the first and second gate means to maintain the "and" gates in the feedback loops open for continuous cyclic operation.

8. A circuit for modifying a binary coded electric signal comprising a first "and" gate having two inputs and one output with one of said inputs providing a connection to a binary coded electronic digital signal, a second "and" gate having two inputs and one output with one of its inputs providing a connection to a digital electronic signal which is the complement of the binary coded signal, a flip-flop having a set and a reset input and providing two opposed outputs one of which may occupy one of two possible voltage states depending on the signal applied to the set and reset inputs, selective means for connecting the reset input of the flip-flop to the number or its complement so that the number is increased when its complement is connected and decreased when it is connected, means for applying a pulse during the last digit time of the binary coded signal to the set input of the flip-flop, means for connecting one of the flip-flop outputs to the other input of the second "and" gate so that the second "and" gate is enabled during at least the first digit time of the binary coded signal, means for connecting the other flip-flop output to the other input of the first "and" gate, an "or" gate for combining the outputs of the first and second "and" gates to provide an incrementally modified binary coded signal, a first feedback loop connected between the "or" gate and the said first "and" gate, said first feedback loop including a delay circuit which provides a delay equal to the length of the binary coded electronic signal and an "and" gate, a second feedback loop connected between the "or" gate and the said second "and" gate, said second feedback loop including an inverter connected directly to the "or" gate, a delay circuit which provides a delay equal to the length of the binary coded electronic signal and an "and" gate, voltage supply means connected to the "and" gates in the first and second feedback loops for maintaining said gates in an enabled condition to maintain said loops closed, first selective means connected to the "or" gate and to the said inverter for supplying an electric output when the values of the output from the "or" gate and its complement from the inverter attain the preselected value, means for alternatively connecting the output from said first selective means or the output from the "or" gate to the voltage supply means to disable said supply means and the gates in the feedback loops whenever the connected means develops an output, and second selective means connected to said voltage supply means for overriding the outputs from the first selective means or the "or" gate to maintain the "and" gates in the feedback loops open for continuous cyclic operation.

9. A circuit for modifying a binary coded electronic signal comprising a first "and" gate switching means including a control input, a signal input and a signal output, a first terminal means for connecting said first "and" gate switching means to a digital binary coded electronic signal, a second "and" gate switching means including a control input, a signal input and a signal output, a second terminal means connecting said second "and" gate switching means to an electronic digital signal which is the complement of the said binary coded signal, bistable switch means having a set and reset input and providing two outputs (0, 1), (1, 0) dependent on the signal applied to a respective one of said set and reset inputs, means for connecting one output of the bistable switch means to the control input of the second "and" gate switching means and for connecting the other output of the bistable switch means to the control input of the first "and" gate switching means, selective logic control means for connecting either the said first or second terminal means to the reset input of the bistable switch means to count down from the said binary coded signal when the first terminal means is connected and to count up from the said binary coded signal when the second terminal means is connected, a timing bit generator for supplying a pulse during the last digit time of the binary coded signal to the set input of the bistable switch means so that the said second "and" gate switch means is enabled during at least the first digit of the binary coded electric signal, and "or" gate means for combining the outputs of the first and second "and" gate switching means to provide the modified binary coded signal.

10. A circuit for modifying a binary coded electronic signal as set forth in claim 9 further characterized by having a first feed back loop connected between the output of the "or" gate means and the signal input of the first "and" gate switching means, said first loop including a delay means providing a delay equal to the length of the binary coded signal whereby the modified binary coded signal is applied to the signal input of the first "and" gate switching means after the binary coded signal has been received, and a second feed back loop connected between the output of the "or" gate means and the signal input of the second "and" gate switching means, said second loop including an inverter and a delay means providing a delay equal to the length of the binary coded signal whereby the complement of the modified binary coded signal is applied to the signal input of the second "and' gate switching means after the complement of the binary coded signal has been received.

11. A circuit for modifying a binary coded electronic signal as set forth in claim 10 further characterized by having selectively operable means connected to the "or" gate means and to the said inverter in the second feed back loop for supplying an output when the numerical value of the output of the "or" gate means attains a selected value, and means responsive to the said output from the selectively operable means for opening the first and second feed back loops whereby the count is stopped at the selected value.

12. A circuit for modifying a binary coded electronic signal as set forth in claim 9 further characterized by having a first feed back loop connected between the "or" gate means and the first "and" gate switching means signal input said first loop including a first delay circuit which provides a delay equal to the length of the binary coded electronic signal and a third "and" gate switching means for opening and closing the first loop, a second feed back loop connected between the "or" gate means and the said second "and" gate switching means signal input, said second feed back loop including an inverter connected directly to the "or" gate means, a second delay circuit which provides a delay equal to the length of the binary coded electronic signal and a fourth "and" gate switching means for opening and closing the second loop, a second bistable switch means having at least one output (1, 0) connected to the third and fourth "and" gate switching means for maintaining said third and fourth "and" gate switching means in an enabled condition when said output of said second bistable switch means occupies the (1) state, first selectively operable means connected to the "or" gate means and to the said inverter for supplying an electric output when the numerical value of the output from the "or" gate means attains the selected value, bistable logic control means for alternatively connecting the output from said first selectively operable means or the output from the "or" gate means to the second bistable switch means to switch the second bistable switch means output from (1) to (0) when the connected means provides a predetermined output whereby said third and fourth "and" gate switching means are disabled and the first and second feed back loops are opened, and second selectively operable means connected to said second bistable switch means for overriding the output from the bistable logic control means to maintain the second bistable switch means output at (1) whereby the third and fourth "and" gate switching means remain enabled to provide continuous cyclic operation.

References Cited in the file of this patent

UNITED STATES PATENTS

| | | |
|---|---|---|
| 2,715,678 | Barney | Aug. 16, 1955 |
| 2,972,718 | Alperin et al. | Feb. 21, 1961 |
| 2,991,449 | Lee | July 4, 1961 |